United States Patent
Uppathil et al.

(10) Patent No.: US 10,931,488 B2
(45) Date of Patent: Feb. 23, 2021

(54) FRONT-END TRANSCEIVERS WITH MULTIPLE RECEPTION CHANNELS

(71) Applicant: Texas Instruments Incorporated, Dallas, TX (US)

(72) Inventors: Satish V. Uppathil, Allen, TX (US); Nikolaus Klemmer, Dallas, TX (US); Fikret Dulger, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 537 days.

(21) Appl. No.: 14/811,618

(22) Filed: Jul. 28, 2015

(65) Prior Publication Data

US 2016/0043768 A1    Feb. 11, 2016

Related U.S. Application Data

(60) Provisional application No. 62/033,403, filed on Aug. 5, 2014.

(51) Int. Cl.

| H04B 1/26 | (2006.01) |
|---|---|
| H04M 1/00 | (2006.01) |
| H04L 27/148 | (2006.01) |
| H04B 1/00 | (2006.01) |

(52) U.S. Cl.
CPC ......... *H04L 27/148* (2013.01); *H04B 1/0082* (2013.01)

(58) Field of Classification Search
CPC .......... H04B 1/005; H04B 1/006; H04B 1/16; H04B 1/26; H04B 1/28; H04B 1/30; H04B 1/40; H04B 1/406; H04B 7/0817; H04B 7/0871; H04B 15/05; H04B 17/20; H04B 2215/065; H04B 1/06; H04B 7/0413; H04B 7/08; H04B 15/06; H03D 7/165; H04W 88/06
USPC .... 455/132, 133, 136, 269, 272, 277.2, 333, 455/552.1, 553.1
See application file for complete search history.

(56) References Cited

U.S. PATENT DOCUMENTS

| 5,878,332 A | * | 3/1999 | Wang | H04B 1/406 455/552.1 |
|---|---|---|---|---|
| 6,728,517 B2 | * | 4/2004 | Sugar | H04B 1/005 455/552.1 |
| 6,954,446 B2 | * | 10/2005 | Kuffner | H04B 1/005 455/552.1 |
| 7,027,833 B1 | * | 4/2006 | Goodman | H04B 1/005 455/553.1 |
| 7,092,676 B2 | * | 8/2006 | Abdelgany | H04B 1/005 455/324 |

(Continued)

*Primary Examiner* — Quochien B Vuong
(74) *Attorney, Agent, or Firm* — Michael A. Davis, Jr.; Charles A. Brill; Frank D. Cimino (57) ABSTRACT

A front-end receiver includes a first mixer of a first channel, a second mixer of a second channel, and a switching circuit that is configured to select the first mixer or the second mixer during a particular time period. Upon being selected, one of the first mixer or the second mixer is configured to deliver a down-converted signal that down-converts a respective RF signal of either the first or second reception channel. As the tasks of down-conversion and multiplexing are combined at the mixer level, the first and second reception channels may share a baseband circuit while being able to provide a well-balanced metrics of channel isolation, low noise figure, and linearity.

20 Claims, 3 Drawing Sheets

(56) References Cited

U.S. PATENT DOCUMENTS

| | | | | |
|---|---|---|---|---|
| 7,215,938 B2* | 5/2007 | Asayama | ............... | H03J 3/08 |
| | | | | 455/333 |
| 7,398,068 B2* | 7/2008 | Javor | ............... | H04B 1/30 |
| | | | | 455/324 |
| 7,636,554 B2* | 12/2009 | Sugar | ............... | H04B 1/005 |
| | | | | 455/272 |
| 7,818,028 B2* | 10/2010 | Vassiliou | ............... | H04B 1/30 |
| | | | | 455/552.1 |
| 8,428,544 B2* | 4/2013 | Heck | ............... | H03D 7/1441 |
| | | | | 455/131 |
| 8,521,221 B2* | 8/2013 | Lu | ............... | H04B 1/0053 |
| | | | | 455/552.1 |

* cited by examiner

FIG. 2

FRONT-END TRANSCEIVERS WITH MULTIPLE RECEPTION CHANNELS

CROSS REFERENCE TO RELATED APPLICATIONS

Under 35 U.S.C. § 119(e), this application claims the benefit of priority of U.S. Provisional Application 62/033,403 filed Aug. 5, 2014, which is hereby incorporated by reference in its entirety.

BACKGROUND

Front-end transceivers are used in wireless communication systems for transmitting and receiving radio frequency signals. A typical front-end transceiver includes a front-end receiver that has one or more reception paths. In broadband applications, each of the reception paths may be dedicated to a particular communication channel that occupies a specific frequency band. The front-end receiver is responsible for selecting one of the reception paths and down-converting the selected radio frequency signal to a baseband signal. When the selection process is performed after the down-conversion process, the front-end receiver may incur a size penalty because each reception path is paired with a baseband circuit, which typically takes up a large area within a front-end receiver integrated circuit.

However, when the selection process is performed prior to the down conversion process, a tradeoff is made between channel isolation on the one hand and noise figure and linearity on the other hand. For instance, by placing the reception paths closer to one another, routing parasitic effects are reduced but at the expense of poor channel isolation. In contrast, by spacing the reception paths farther apart, channel isolation can be improved but parasitic effects in routing will likely increase, which leads to the degradation of noise figure and linearity. Thus, there is a need for a front-end receiver with multiple reception channels that can provide a balanced metrics of size efficiency, channel isolation, low noise figure, and linearity.

SUMMARY

The present disclosure describes systems and techniques relating to multiplexing and down-converting multiple reception channels of a front-end receiver (FER) for use in a broadband transceiver. The disclosed FER performs down-conversion and multiplexing at the mixer level. Advantageously, the disclosed FER achieves size efficiency by having the reception channels to share a baseband circuit and provides a well-balanced metrics of channel isolation, low noise figure, and linearity by multiplexing the down-converted signals.

In one implementation, for example, the disclosed FER includes an integrated circuit for receiving, down-converting, and multiplexing radio frequency (RF) signals. The integrated circuit includes a first input port, a second input port, a first mixer, a second mixer, and a convergent node. The first input port is configured to receive a first RF signal having a first carrier frequency. The second input port is configured to receive a second RF signal having a second carrier frequency. The first mixer is coupled with the first input port. The first mixer has a first output lead that is configured to deliver a first down-converted signal by reducing the first carrier frequency of the first RF signal. The second mixer is coupled with the second input port. The second mixer has a second output lead that is configured to deliver a second down-converted signal by reducing the second carrier frequency of the second RF signal. The convergent node is coupled with the first output lead and the second output lead. The convergent node receives the first down-converted signal only when the first mixer is selected, and the convergent node receives the second down-converted signal only when the second mixer is selected.

In another implementation, for example, the disclosed FER includes another integrated circuit for receiving, down-converting, and multiplexing radio frequency (RF) signals. The integrated circuit includes a first input port, a second input port, a first mixer, a second mixer, and a switching circuit. The first input port is configured to receive a first RF signal having a first carrier frequency. The second input port configured to receive a second RF signal having a second carrier frequency. The first mixer is coupled with the first input port. The first mixer has a first output lead that is configured to deliver a first down-converted signal down-converting the first RF signal only when the first mixer is enabled. The second mixer is coupled with the second input port. The second mixer has a second output lead that is configured to deliver a second down-converted signal down-converting the second RF signal only when the second mixer is enabled. The switching circuit is coupled with the first mixer and the second mixer. The switching circuit is configured to receive a channel selection signal to selectively enable one of the first or second mixer based on the channel selection signal.

In yet another implementation, for example, disclosed FER includes an antenna, a first mixer, a second mixer, and a switching circuit. The antenna is configured to receive a first RF signal during a first time period and a second RF signal during a second time period. The first time period does not overlap with the second time period. The first RF signal has a first carrier frequency, and the second RF signal has a second carrier frequency. The first mixer is coupled with the antenna, and it has a first output lead that is configured to deliver a first down-converted signal down-converting the first RF signal only when the first mixer is enabled. The second mixer is coupled with the antenna, and it has a second output lead that is configured to deliver a second down-converted signal down-converting the second RF signal only when the second mixer is enabled. The switching circuit is configured to receive a channel selection signal to selectively enable one of the first or second mixer based on the channel selection signal The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus; and apparatus implementations can be realized from a disclosed system, computer-readable medium, or method. Similarly, method implementations can be realized from a disclosed system, computer-readable medium, or apparatus; and system implementations can be realized from a disclosed method, computer-readable medium, or apparatus.

For example, one or more disclosed embodiments can be implemented in various systems and apparatus, including, but not limited to, a special purpose data processing apparatus (e.g., a broadband wireless base station, a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Like reference symbols in the various drawings indicate like elements. Details of one or more implementations of the present disclosure are set forth in the accompanying drawings and the description below. The figures are not drawn to scale and they are provided merely to illustrate the disclosure. Specific details, relationships, and methods are set forth to provide an understanding of the disclosure. Other features and advantages may be apparent from the description and drawings, and from the claims.

DETAILED DESCRIPTION

Figure 1A:
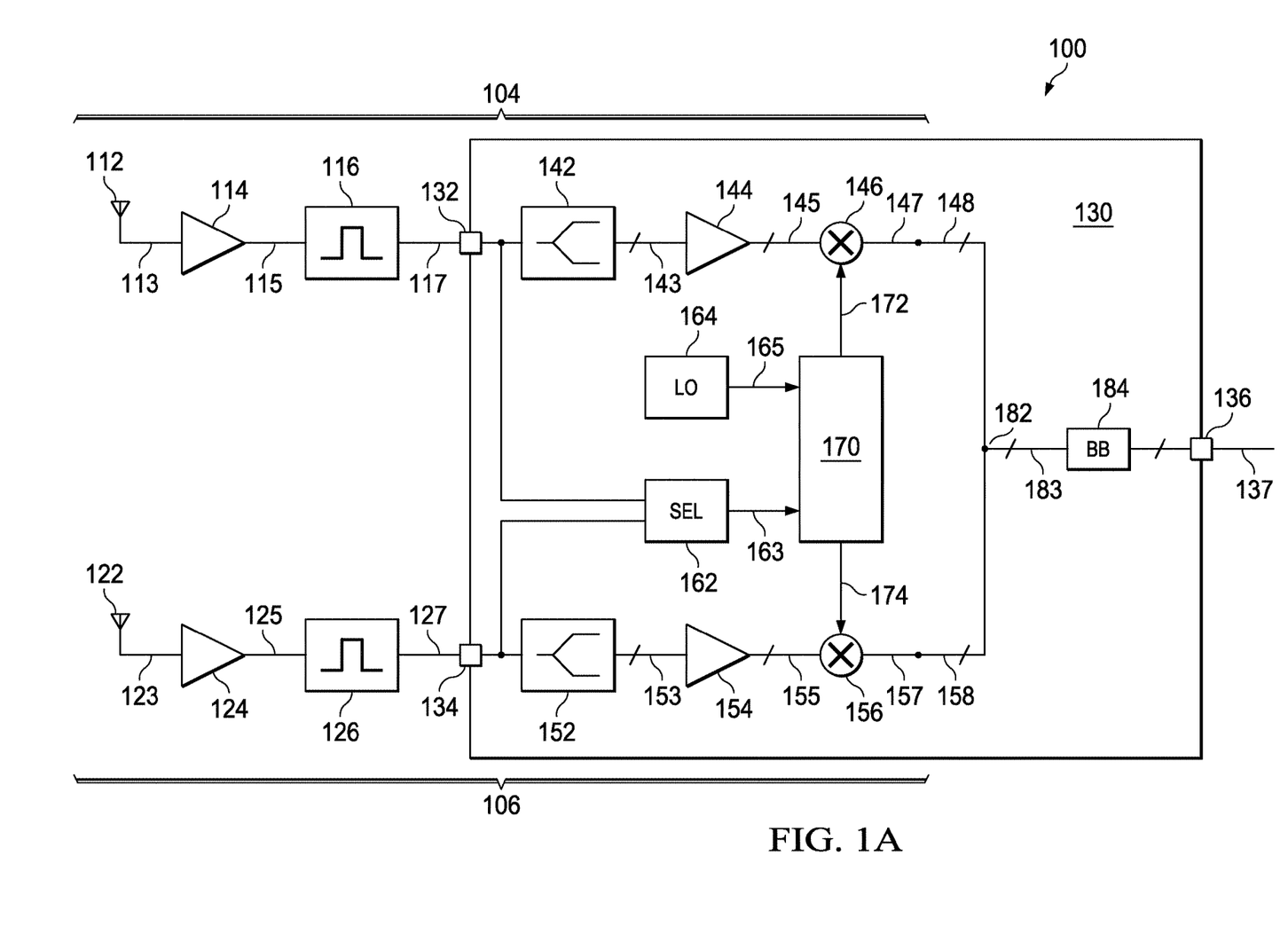
FIG. 1A shows a schematic view of an exemplary front-end receiver according to an aspect of the present disclosure.

FIG. 1A shows a schematic view of an exemplary front-end receiver (FER) 100 according to an aspect of the present disclosure. The FER 100 can be an integral part of a broadband wireless transceiver for use in a base station or a mobile device. The FER 100 is capable of receiving radio frequency (RF) signals from multiple reception channels, each of which may be dedicated to a particular frequency band. The reception channels are received and processed by one or more reception paths. Each reception path includes circuit components that are either discretely embedded on a circuit board or integrated within an integrated circuit.

The FER 100 includes a first reception path 104 and a second reception path 106. The first reception path 104 includes a first antenna 112, a first low noise amplifier (LNA) 114, a first bandpass filter 116, a first balun circuit 142, a first matching amplifier 144, and a first mixer 146. A portion of the first reception path 104 extends into a front-end integrated circuit (FEIC) 130, which integrates the first balun circuit 142, the first matching amplifier 144, and the first mixer 146. With these circuit components in operation, the first reception path 104 is configured to receive a first RF signal occupying a first reception channel, and the first reception path 104 is also configured to down-convert the first RF signal from a first carrier frequency (which belongs to the first reception channel) to a baseband frequency.

The second reception path 106 includes a second antenna 122, a second LNA 124, a second bandpass filter 126, a second balun circuit 152, a second matching amplifier 154, and a second mixer 156. A portion of the second reception path 106 extends into the FEIC 130, which integrates the second balun circuit 152, the second matching amplifier 154, and the second mixer 156. With these circuit components in operation, the second reception path 106 is configured to receive a second RF signal occupying a second reception channel, and the second reception path 106 is also configured to down-convert the second RF signal from a second carrier frequency (which belongs to the second reception channel) to a baseband frequency. For the sake of simplicity, FIG. 1A shows that the FER 100 includes only two reception paths even though the FER 100 may include additional reception paths for receiving RF signals from other reception channels. Moreover, the first and second reception paths 104 and 106 may share a single antenna instead of having two antennas if the first and second RF signals occupy two distinct reception channels.

Regarding the operation of the first reception path 104, the first antenna 112 is structured to receive a first reception RF signal 113 during a first time period. The first LNA 114 is connected to the first antenna 112 to receive the first reception RF signal 113. When activated, the first LNA 114 amplifies the first reception RF signal 113 to generate a first amplified RF signal 115. In general, the first amplified RF signal 115 has greater amplitude than the first reception RF signal 113 and removes the noisy components introduced during transmission and reception. Thus, the first amplified RF signal 115 maintains the same first carrier frequency as the first reception RF signal 113.

The first bandpass filter 116 is connected to the first LNA 114 to receive the first amplified RF signal 115. When activated, the first bandpass filter 116 filters side band noises from the first amplified RF signal 115. The first bandpass filter 116 generates a first bandpass RF signal 117, which retains the first reception channel portion of the first amplified RF signal 115. Accordingly, the first bandpass RF signal 117 maintains the same first carrier frequency as the first reception RF signal 113. In an alternative embodiment, the first bandpass filter 116 may be removed if the first antenna 112 includes bandpass characteristics. In that case, the first reception RF signal 113 is a bandpass RF signal like the first bandpass signal 117.

Regarding the operation of the second reception path 106, the second antenna 122 is structured to receive a second reception RF signal 123 during a second time period. Depending on the particular implementation, the second time period may or may not overlap with the first time period during which the first reception RF signal 113 is received. In one implementation, for example, the first time period does not overlap with the second time period where the first and second reception channels occupy overlapping frequency ranges and where the first and second reception paths 104 and 106 share the same antenna. In another implementation, the first time period and the second time period may overlap where the first and second reception channels occupy distinctive frequency ranges or where the first and second reception paths 104 and 106 have separate antennas (e.g., the first antenna 112 and the second antenna 122) or non-overlapping frequency bands.

The second LNA 124 is connected to the second antenna 122 to receive the second reception RF signal 123. When activated, the second LNA 124 amplifies the second reception RF signal 123 to generate a second amplified RF signal 125. In general, the second amplified RF signal 125 has greater amplitude than the second reception RF signal 123 and removes the noisy components introduced during transmission and reception. Thus, the second amplified RF signal 125 maintains the same second carrier frequency as the second reception RF signal 123.

The second bandpass filter 126 is connected to the second LNA 124 to receive the second amplified RF signal 125. When activated, the second bandpass filter 126 filters side band noises from the second amplified RF signal 125. The second bandpass filter 126 generates a second bandpass RF signal 127, which retains the second reception channel portion of the second amplified RF signal 125. Accordingly, the second bandpass RF signal 127 maintains the same second carrier frequency as the second reception RF signal 123. In an alternative embodiment, the second bandpass filter 126 may be removed if the second antenna 122 includes bandpass characteristics. In that case, the second reception RF signal 123 is a bandpass RF signal like the second bandpass signal 127.

The first and second reception paths 104 and 106 extend into the FEIC 130. The FEIC 130 includes a first input port 132 and a second input port 134 for interfacing with the received, amplified, and/or processed RF signals. More specifically, the first input port 132 is configured to receive the first bandpass RF signal 117 with the first carrier frequency, whereas the second input port 134 is configured to receive the second bandpass RF signal 127 with the second carrier frequency.

The FEIC 130 extends the operations of the first reception path 104. The first balun circuit 142 of the FEIC 130 is coupled with the first bandpass filter 116 via the first input port 132 to receive the first bandpass RF signal 117. When activated, the first balun circuit 142 generates a first pair of differential RF signals 143 based on the first bandpass RF signal 117. In general, the first pair of differential RF signals 143 includes a first differential RF signal and a second differential RF signal. At any given point of time, the second differential RF signal may have the same magnitude as, but an opposite polarity from, the first differential RF signal.

The first matching amplifier 144 is connected to the first balun circuit 142 to receive the first pair of differential RF signals 143. When activated, the first matching amplifier 144 matches the input impedance of the first pair of differential RF signals 143 to generate a first pair of amplified differential RF signals 145. The first mixer 146 is coupled with the first input port 132 via the first balun circuit 142 and the first matching amplifier 144. The first mixer 146 serves as a part of a down-conversion means for down-converting the first RF signal (e.g., the first pair of amplified differential RF signals 145 or the first bandpass RF signal 117 if the first balun circuit 142 and the first matching amplifier 144 are optionally removed) by reducing the first carrier frequency to a baseband frequency. When selected and enabled, the first mixer 146 delivers a first down-converted signal 148 via its first output lead 147. By virtue of being selectable, the first mixer 146 is also a part of a multiplexing means for selecting a down-converted reception channel.

Like with the first reception path 104, the FEIC 130 also extends the operations of the second reception path 106. The second balun circuit 152 of the FEIC 130 is coupled with the second bandpass filter 126 via the second input port 134 to receive the second bandpass RF signal 127. When activated, the second balun circuit 152 generates a second pair of differential RF signals 153 based on the second bandpass RF signal 127. In general, the second pair of differential RF signals 153 includes a third differential RF signal and a fourth differential RF signal. At any given point of time, the fourth differential RF signal may have the same magnitude as, but an opposite polarity from, the third differential RF signal.

The second matching amplifier 154 is connected to the second balun circuit 152 to receive the second pair of differential RF signals 153. When activated, the second matching amplifier 154 matches the input impedance of the second pair of differential RF signals 153 to generate a second pair of amplified differential RF signals 155. The second mixer 156 is coupled with the second input port 134 via the second balun circuit 152 and the second matching amplifier 154. The second mixer 156 serves as a part of the down-conversion means for down-converting the second RF signal (e.g., the second pair of amplified differential RF signals 155 or the second bandpass RF signal 127 if the second balun circuit 152 and the second matching amplifier 154 are optionally removed) by reducing the second carrier frequency to a baseband frequency. When selected and enabled, the second mixer 156 delivers a second down-converted signal 158 via its second output lead 157. By virtue of being selectable, the second mixer 156 is also a part of the multiplexing means for selecting a down-converted reception channel.

The FEIC 130 also includes a local oscillator 164 as a part of the down-conversion mean for down-converting a selected RF signal. When activated and calibrated, the local oscillator 164 generates a local oscillation signal 165 with a local oscillation frequency. When received by a selected mixer (e.g., the first mixer 146 or the second mixer 156), the local oscillation signal 165 is used for reducing the carrier frequency by subtracting the local oscillation frequency from the carrier frequency. As a result, the selected RF signal is down-converted to a baseband signal. Depending on the operation of the FER 100, the local oscillation frequency may be set at various levels. In one implementation, for example, the local oscillation frequency can be set within the carrier frequency band. In another implementation, for example, the local oscillation frequency can be set slightly below the carrier frequency band.

The FEIC 130 further includes a channel selection circuit 162 and a switching circuit 170 as a part of the multiplexing means for selecting a reception channel to be down-converted by a reception path. The channel selection circuit 162 is coupled to the first input port 132 and the second input port 134 to receive the first and second bandpass RF signals 117 and 127. The channel selection circuit 162 is configured to generate a channel selection signal 163 for selecting one of the reception paths (e.g., the first reception path 104 or the second reception path 106). The conditions for generating the channel selection signal 163 may vary depending on the operation of the FER 100.

In one implementation, for example, the channel selection circuit 162 is configured to detect a relative activity between the first and second bandpass RF signals 117 and 127. Then, the channel selection circuit 162 generates the channel selection signal 163 with a selection of the reception path having a higher channel activity. For instance, when the first antenna 112 is receiving the first reception RF signal 113 while the second antenna 122 remains idle, the channel selection circuit 162 may detect a higher channel activity in the first bandpass RF signal 117 than in the second bandpass RF signal 127. As a result, the channel selection circuit 162 generates the channel selection signal 163 indicating that the first reception path 104 is selected for down-conversion.

In another implementation, for example, the channel selection circuit 162 is configured to prioritize between the first and second reception paths 104 and 106 based on a control parameter generated or received by the FER 100. Such a prioritization may be useful when more than one reception paths are actively receiving RF signals at a given point of time. Upon performing the prioritization, the channel selection circuit 162 generates the channel selection signal 163 indicating the reception path having a higher priority.

The switching circuit 170 is connected to the channel selection circuit 162 to receive the channel selection signal 163. The switching circuit 170 is also coupled with the first mixer 146 and the second mixer 156. Based on the channel selection signal 163, the switching circuit 170 selects only one of the first mixer 146 or the second mixer 156 for delivering a down-conversion signal (e.g., the first down-converted signal 148 or the second down-converted signal 158). When the first reception path 104 is selected, the switching circuit 170 generates a first enable signal 172 to enable the first mixer 146. Alternatively, when the second reception path 106 is selected, the switching circuit 170 generates a second enable signal 174 to enable the second mixer 156. When enabled, the mixer (e.g., the first mixer 146 or the second mixer 156) receives the local oscillation signal 165 from the local oscillator 164 for down-converting the RF signal. Because the switching circuit 170 enables the function of down-conversion in either the first mixer 146 or the second mixer 156, the switching circuit 170 is also a part of the down-conversion means for down-converting a selected RF signal.

The first mixer 146 and the second mixer 156 are each coupled with the local oscillator 164 for receiving the local oscillation signal 165. In one implementation, the first and second mixers 146 and 156 may be connected directly to the local oscillator 164 for receiving the local oscillation signal 165. In another implementation, such as the one as shown in FIG. 1A, the local oscillator 164 may be selectively coupled with one of the first mixer 146 or the second mixer 156 via the switching circuit 170. In this particular implementation, the switching circuit 170 is connected to the local oscillator 164, and the switching circuit 170 is configured to direct the local oscillation signal 165 to the selected and enabled mixer (e.g., the first mixer 146 or the second mixer 156).

To reduce circuit complexity, the switching circuit 170 may incorporate and relay the local oscillation signal 165 to the first enable signal 172 and/or the second enable signal 174. Upon receiving the local oscillation signal 165 relayed by the first enable signal 172, the first mixer 146 is enabled to generate the first down-converted signal 148 by mixing the first RF signal (e.g., the first pair of differential RF signals 145 or the first bandpass RF signal 117 if circuits 142 and 144 are optionally removed) with the received local oscillation signal 165. As a result, the first down-converted signal 148 has a first down-converted frequency that is based on a subtraction of the local oscillation frequency from the first carrier frequency of the first RF signal.

Alternatively, upon receiving the local oscillation signal 165 relayed by the second enable signal 174, the second mixer 156 is enabled to generate the second down-converted signal 158 by mixing the second RF signal (e.g., the second pair of differential RF signals 155 or the second bandpass RF signal 127 if circuits 152 and 154 are optionally removed) with the received local oscillation signal 165. As a result, the second down-converted signal 158 has a second down-converted frequency that is based on a subtraction of the local oscillation frequency from the second carrier frequency of the second RF signal.

In this less complex circuit configuration, the local oscillator 164, the switching circuit 170, and the selected mixer (e.g., the first mixer 146 or the second mixer 156) combine the down-conversion function with the channel multiplexing function. This combined operation allows multiple reception paths (e.g., the first and second reception paths 104 and 106) to share the same baseband resources, thereby improving size efficiency of the FEIC 130. Moreover, because the multiplexing is performed on a down-converted signal (e.g., the first and second down-converted signals 148 and 158), it can tolerate higher parasitic effects created by inter-path routings. Thus, the input ports (e.g., the first input port and the second input port 132 and 134) of the FEIC 130 can be placed farther apart to improve channel isolation yet without having to sustain any significant penalty on noise figures or linearity. As a whole, the FER 100 can achieve a balanced metrics of size efficiency, channel isolation, low noise figures, and linearity.

To collect and further process the down-converted signals, the FEIC 130 includes a convergent node 182, which is connected to an input of a baseband circuit 184. The convergent node 182 is coupled with the first output lead 147 and the second output lead 157. When the first mixer 146 is selected and enabled, the convergent node 182 receives the first down-converted signal 148 only. In contrast, when the second mixer 156 is selected and enabled, the convergent node 182 receives the second down-converted signal 158 only. In either case, the baseband circuit 184 receives the down-converted signal from the convergent node 182. The baseband circuit 184 is configured to generate an output signal 137 by extracting data embedded in the down-converted signal. The baseband circuit 184 then delivers the output signal 137 to the output port 136 of the FEIC 130.

In the circuit configuration of FIG. 1A, the first enable signal 172 and the second enable signal 174 multiplexes the respective mixers and provides the selected mixer with the local oscillation signal 165. As such, only one mixer will generate and deliver a down-converted signal at a given point of time. Hence, the convergent node 182 can be directly connected to the first output lead 147 and the second output lead 157 in this particular configuration.

Figure 1B:
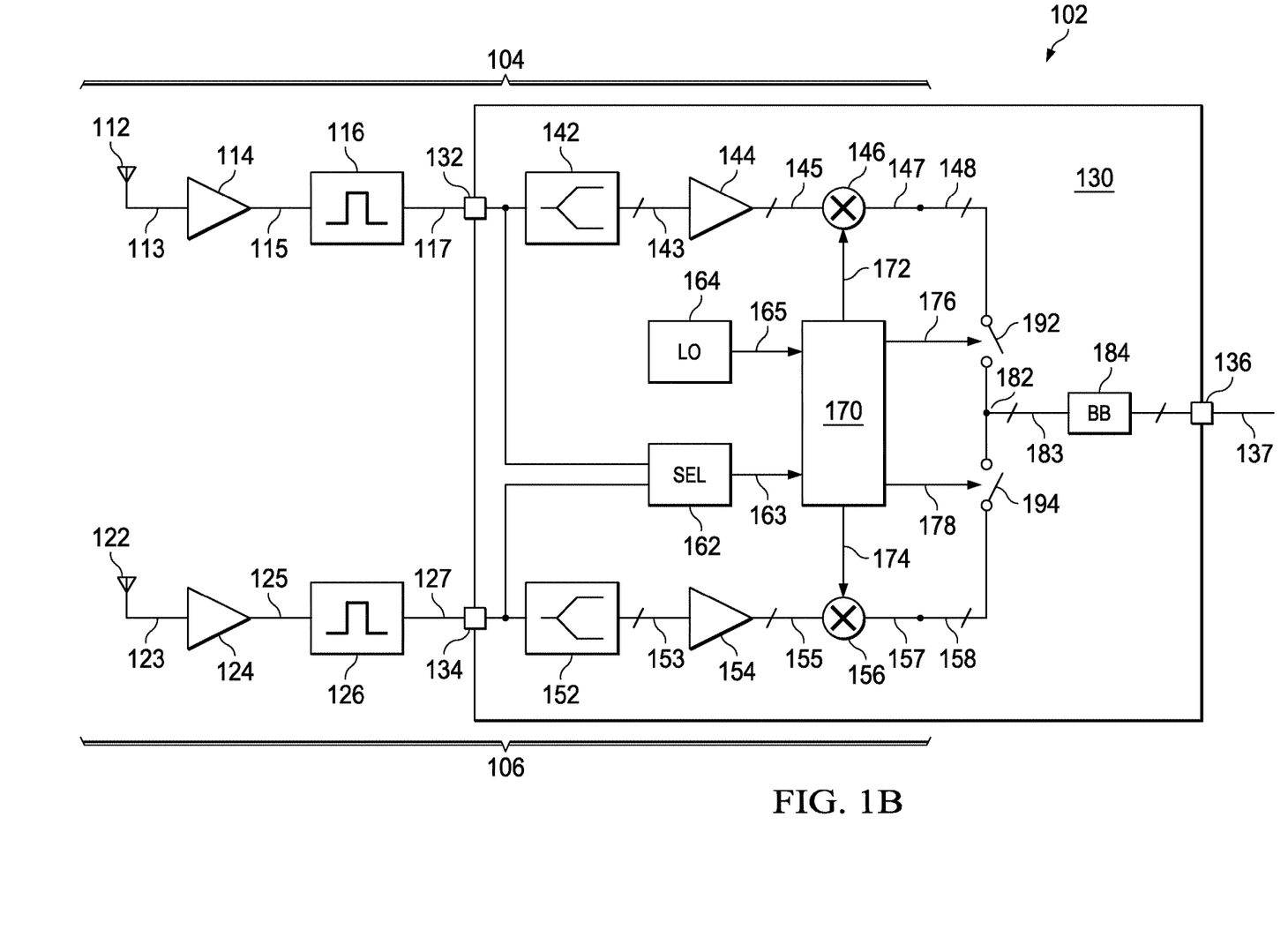
FIG. 1B shows a schematic view of an exemplary front-end receiver according to another aspect of the present disclosure.

In an alternate FER 102 as shown in FIG. 1B, the convergent node 182 may be selectively coupled with the first output lead 147 and the second output lead 157 when both the first and second mixers 146 and 156 can be enabled at the same time. The FER 102 includes largely the same circuit structure and functional features as the FER 100 except that the local oscillation signal 165 is delivered to the first mixer 146 and the second mixer 156 separately from the first and second enable signals 172 and 174. In the event that both the first and second enable signals 172 and 174 are active, the first mixer 146 and the second mixer 156 can respectively generate the first and second down-converted signals 148 and 158 at the same time. To avoid simultaneous delivery of the first and second down-converted signals 148 and 158 to the convergent node 182, the switching circuit 170 is configured to selectively couple only one of the output leads 147 or 157 to the convergent node 182 at any given point of time.

More specifically, the FEIC 130 includes a first output switch 192 that is connected between the first output lead 147 and the convergent node 182, and a second output switch 194 that is connected between the second output lead 157 and the convergent node 182. The switching circuit 170 is configured to generate a first output enable signal 176 and a second output enable signal 178 based on the channel selection signal 163. The switching circuit 170 activates the first output enable signal 176 only when the first reception path 104 is selected. In doing so, the switching circuit 170 selectively couples the first output lead 147 to the convergent node 182. Similarly, the switching circuit 170 activates the second output enable signal 178 only when the second reception path 106 is selected. In doing so, the switching circuit 170 selectively couples the second output lead 157 to the convergent node 182.

In this circuit configuration, the local oscillator 164, the switching circuit 170, and the selected mixer (e.g., the first mixer 146 or the second mixer 156) operate to perform the channel multiplexing function after the down-conversion function. This sequence of operations allows multiple reception paths (e.g., the first and second reception paths 104 and 106) to share the same baseband resources, thereby improving the size efficiency of the FEIC 130. Moreover, because the multiplexing is performed on a down-converted signal (e.g., the first and second down-converted signals 148 and 158), it can tolerate higher parasitic effects created by inter-path routings. Thus, the input ports (e.g., the first input port and the second input port 132 and 134) of the FEIC 130 can be placed farther apart to improve channel isolation yet without having to sustain any significant penalty in noise figures or linearity. As a whole, the FER 102 can achieve a balanced metrics of size efficiency, channel isolation, low noise figures, and linearity.

Figure 2:
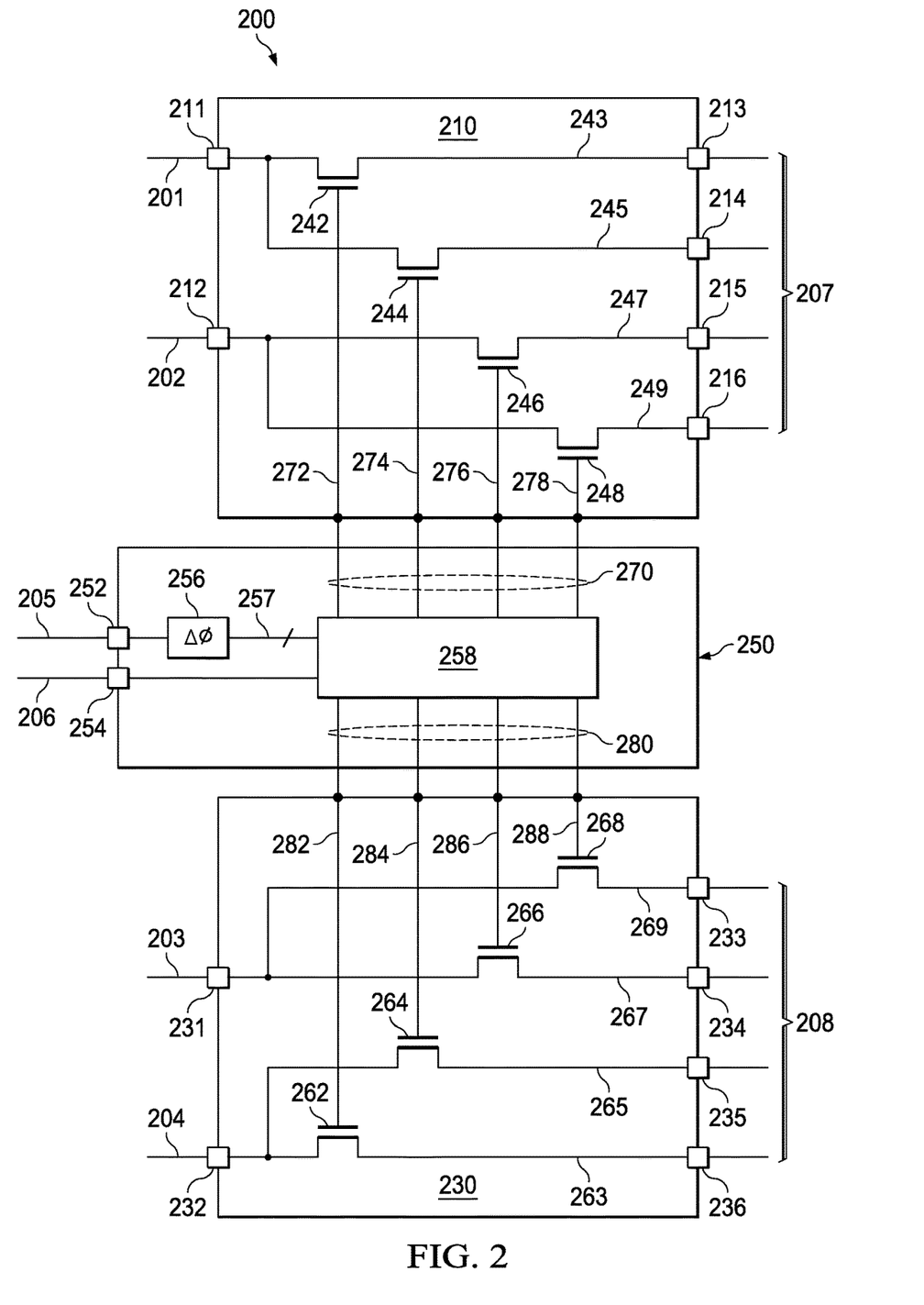
FIG. 2 shows a schematic view of an exemplary down-conversion multiplexer circuit according to an aspect of the present disclosure.

FIG. 2 shows a schematic view of an exemplary down-conversion multiplexer (DCM) 200 according to an aspect of the present disclosure. The DCM 200 provides a specific circuit implementation of the switching circuit 170, the first mixer 146 and the second mixer 156 of the FEIC 130 but without restricting other implementations consistent with the descriptions of FIGS. 1A and 1B. The DCM 200 includes a first mixer 210, a second mixer 230, and a switching circuit 250.

The switching circuit 250 is structured to perform the functions of the switching circuit 170. For input reception, the switching circuit 250 includes a first input port 252 to receive a local oscillation signal 205, and a second input port 254 to receive a channel selection signal 206. The switching circuit 250 includes a phase shifting circuit 256 to split up the local oscillation (LO) signal 205 into four phase-adjusted LO signals 257. The four phase-adjusted LO signals 257 can include a 90-degree successive phase shift from one another.

The switching circuit 250 also includes a LO multiplexer 258 to generate a first enable signal 270 and a second enable signal 280. The LO multiplexer 258 receives the channel selection signal 206 and determines which one of the first mixer 210 or the second mixer 230 is selected based on the channel selection signal 206. The LO multiplexer 258 also receives the phase-adjusted LO signals 257 for incorporation to either one of the first enable signal 270 or the second enable signal 280.

When the first mixer 210 is selected, the LO multiplexer 258 activates the first enable signal 270 by relaying the phase-adjusted LO signals 257 to the first enable signal 270. While activated, the first enable signal 270 includes a first 0-degree local oscillation (LO_0) signal 272, a first 90-degree local oscillation (LO_90) signal 274, a first 180-degree local oscillation (LO_180) signal 276, and a first 270-degree local oscillation signal (LO_270) signal 278. The first LO_0 signal 272 shares the same local oscillation frequency as the local oscillation signal 205 and has a 0-degree phase shift from the local oscillation signal 205. The first LO_90 signal 274 shares the same local oscillation frequency as the local oscillation signal 205, but it has a 90-degree phase shift from the local oscillation signal 205. The first LO_180 signal 276 shares the same local oscillation frequency as the local oscillation signal 205, but it has a 180-degree phase shift from the local oscillation signal 205. The first LO_270 signal 278 shares the same local oscillation frequency as the local oscillation signal 205, but it has a 270-degree phase shift from the local oscillation signal 205.

The first mixer 210 includes a first positive input port 211 to receive a first positive differential RF signal 201, and a first negative input port 212 to receive a first negative differential RF signal 202. The first positive and negative differential RF signals 201 and 202 can be the first pair of differential RF signals 145 as described in FIG. 1A or a derivative thereof. The first mixer 210 includes multiple pass gates (e.g., 242, 244, 246, and 248) to down-convert the first positive and negative differential RF signals 201 and 202 using the activated first enable signal 270. These pass gates can be implemented using n-channel transistors (as shown in FIG. 2), p-channel transistors, and/or complimentary pass gate transistor pair.

In one implementation, the first mixer 210 includes a first positive in-phase pass gate (PIPG) 242, a first positive quadrature pass gate (PQPG) 244, a first negative in-phase pass gate (NIPG) 246, and a first negative quadrature pass gate (NQPG) 248. The first PIPG 242 includes an input node coupled with the first positive input port 211 to receive the first positive differential RF (PDRF) signal 201, and a control gate coupled with the local oscillation multiplexer (LOM) 258 to receive the first LO_0 signal 272. Passing the first PDRF signal 201 according to the first LO_0 signal 272, the first PIPG 242 generates a first positive in-phase (PI) signal 243. The first PI signal 243 is a down-converted version of the first PDRF signal 201 as the carrier frequency of the first PDRF signal 201 is subtracted by the local oscillation frequency of the first LO_0 signal 272. The first PIPG 242 includes an output node to deliver the first PI signal 243 to a first PI output port 213. The first PI signal 243 is a part of the first down-converted signal 207.

The first PQPG 244 includes an input node coupled with the first positive input port 211 to receive the first PDRF signal 201, and a control gate coupled with the LOM 258 to receive the first LO_90 signal 274. Passing the first PDRF signal 201 according to the first LO_90 signal 274, the first PQPG 244 generates a first positive quadrature (PQ) signal 245. The first PQ signal 245 is a down-converted version of the first PDRF signal 201 as the carrier frequency of the first PDRF signal 201 is subtracted by the local oscillation frequency of the first LO_90 signal 274. The first PQPG 244 includes an output node to deliver the first PQ signal 245 to a first PQ output port 214. The first PQ signal 245 is a part of the first down-converted signal 207.

The first NIPG 246 includes an input node coupled with the first negative input port 212 to receive the first negative differential RF (NDRF) signal 202, and a control gate coupled with the LOM 258 to receive the first LO_180 signal 276. Passing the first NDRF signal 202 according to the first LO_180 signal 276, the first NIPG 246 generates a first negative in-phase (NI) signal 247. The first NI signal 247 is a down-converted version of the first NDRF signal 202 as the carrier frequency of the first NDRF signal 202 is subtracted by the local oscillation frequency of the first LO_180 signal 276. The first NIPG 246 includes an output node to deliver the first NI signal 247 to a first NI output port 215. The first NI signal 247 is a part of the first down-converted signal 207.

The first NQPG 248 includes an input node coupled with the first negative input port 212 to receive the first NDRF signal 202, and a control gate coupled with the LOM 258 to receive the first LO_270 signal 278. Passing the first NDRF signal 202 according to the first LO_270 signal 278, the first NQPG 248 generates a first negative quadrature (NQ) signal 249. The first NQ signal 249 is a down-converted version of the first NDRF signal 202 as the carrier frequency of the first NDRF signal 202 is subtracted by the local oscillation frequency of the first LO_270 signal 278. The first NQPG 248 includes an output node to deliver the first NQ signal 249 to a first NQ output port 216. The first NQ signal 249 is a part of the first down-converted signal 207.

When the second mixer 230 is selected, the LO multiplexer 258 activates the second enable signal 280 by relaying the phase-adjusted LO signals 257 to the second enable signal 280. While activated, the second enable signal 280 includes a second 0-degree local oscillation (LO_0) signal 282, a second 90-degree local oscillation (LO_90) signal 284, a second 180-degree local oscillation (LO_180) signal 286, and a second 270-degree local oscillation signal (LO_270) signal 288. The second LO_0 signal 282 shares the same local oscillation frequency as the local oscillation signal 205 and has a 0-degree phase shift from the local oscillation signal 205. The second LO_90 signal 284 shares the same local oscillation frequency as the local oscillation signal 205, but it has a 90-degree phase shift from the local oscillation signal 205. The second LO_180 signal 286 shares the same local oscillation frequency as the local oscillation signal 205, but it has a 180-degree phase shift from the local oscillation signal 205. The second LO_270 signal 288 shares the same local oscillation frequency as the local oscillation signal 205, but it has a 270-degree phase shift from the local oscillation signal 205.

The second mixer 230 includes a second positive input port 232 to receive a second positive differential RF signal 204, and a second negative input port 231 to receive a second negative differential RF signal 203. The second positive and negative differential RF signals 204 and 202 can be the second pair of differential RF signals 155 as described in FIG. 1A or a derivative thereof. The second mixer 230 includes multiple pass gates (e.g., 262, 264, 266, and 268) to down-convert the second positive and negative differential RF signals 204 and 203 using the activated second enable signal 280. These pass gates can be implemented using n-channel transistors (as shown in FIG. 2), p-channel transistors, and/or complimentary pass gate transistor pair.

In one implementation, the second mixer 230 includes a second positive in-phase pass gate (PIPG) 262, a second positive quadrature pass gate (PQPG) 264, a second negative in-phase pass gate (NIPG) 266, and a second negative quadrature pass gate (NQPG) 268. The second PIPG 262 includes an input node coupled with the second positive input port 232 to receive the second positive differential RF (PDRF) signal 204, and a control gate coupled with the local oscillation multiplexer (LOM) 258 to receive the second LO_0 signal 282. Passing the second PDRF signal 204 according to the second LO_0 signal 282, the second PIPG 262 generates a second positive in-phase (PI) signal 263. The second PI signal 263 is a down-converted version of the second PDRF signal 204 as the carrier frequency of the second PDRF signal 204 is subtracted by the local oscillation frequency of the second LO_0 signal 282. The second PIPG 262 includes an output node to deliver the second PI signal 263 to a second PI output port 233. The second PI signal 263 is a part of the second down-converted signal 208.

The second PQPG 264 includes an input node coupled with the second positive input port 232 to receive the second PDRF signal 204, and a control gate coupled with the LOM 258 to receive the second LO_90 signal 284. Passing the second PDRF signal 203 according to the second LO_90 signal 284, the second PQPG 264 generates a second positive quadrature (PQ) signal 265. The second PQ signal 265 is a down-converted version of the second PDRF signal 204 as the carrier frequency of the second PDRF signal 204 is subtracted by the local oscillation frequency of the second LO_90 signal 284. The second PQPG 264 includes an output node to deliver the second PQ signal 265 to a second PQ output port 234. The second PQ signal 265 is a part of the second down-converted signal 208.

The second NIPG 266 includes an input node coupled with the second negative input port 231 to receive the second negative differential RF (NDRF) signal 203, and a control gate coupled with the LOM 258 to receive the second LO_180 signal 286. Passing the second NDRF signal 204 according to the second LO_180 signal 286, the second NIPG 266 generates a second negative in-phase (NI) signal 267. The second NI signal 267 is a down-converted version of the second NDRF signal 203 as the carrier frequency of the second NDRF signal 203 is subtracted by the local oscillation frequency of the second LO_180 signal 286. The second NIPG 266 includes an output node to deliver the second NI signal 267 to a second NI output port 235. The second NI signal 267 is a part of the second down-converted signal 208.

The second NQPG 268 includes an input node coupled with the second negative input port 231 to receive the second NDRF signal 203, and a control gate coupled with the LOM 258 to receive the second LO_270 signal 288. Passing the second NDRF signal 204 according to the second LO_270 signal 288, the second NQPG 268 generates a second negative quadrature (NQ) signal 269. The second NQ signal 269 is a down-converted version of the second NDRF signal 203 as the carrier frequency of the second NDRF signal 203 is subtracted by the local oscillation frequency of the second LO_270 signal 288. The second NQPG 268 includes an output node to deliver the second NQ signal 269 to a second NQ output port 236. The second NQ signal 269 is a part of the second down-converted signal 208.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the methods and/or operations described (such as a program encoded in a computer-readable medium, which can be a memory device, a storage device, a machine-readable storage substrate, or other physical, machine-readable medium, or a combination of one or more of them).

Consistent with the present disclosure, the term "configured to" purports to describe the structural and functional characteristics of one or more tangible non-transitory components. For example, the term "configured to" can be understood as having a particular configuration that is designed or dedicated for performing a certain function. Within this understanding, a device is "configured to" perform a certain function if such a device includes tangible non-transitory components that can be enabled, activated, or powered to perform that certain function. While the term "configured to" may encompass the notion of being configurable, this term should not be limited to such a narrow definition. Thus, when used for describing a device, the term "configured to" does not require the described device to be configurable at any given point of time.

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. An integrated circuit comprising:
   a first input port configured to receive a first radio frequency (RF) signal having a first carrier frequency;
   a second input port configured to receive a second RF signal having a second carrier frequency;
   a first mixer coupled with the first input port, the first mixer having a first output lead configured to deliver a first down-converted signal by reducing the first carrier frequency of the first RF signal to a baseband frequency;
   a second mixer coupled with the second input port, the second mixer having a second output lead configured to deliver a second down-converted signal by reducing the second carrier frequency of the second RF signal to the baseband frequency; and
   a convergent node coupled with the first output lead and the second output lead, the convergent node receiving the first down-converted signal only when the first mixer is selected, and the convergent node receiving the second down-converted signal only when the second mixer is selected.

2. The integrated circuit of claim 1, further comprising:
   a switching circuit coupled to the first mixer and the second mixer, the switching circuit configured to receive a channel selection signal and activate only one of the first mixer or the second mixer based on the channel selection signal.

3. The integrated circuit of claim 1, further comprising:
   a switching circuit coupled to the first output lead and the second output lead, the switching circuit configured to receive a channel selection signal and selectively connect only one of the first output lead or the second output lead to the convergent node based on the channel selection signal.

4. The integrated circuit of claim 1, further comprising:
   a local oscillator selectively coupled with the first mixer or the second mixer, the local oscillator configured to generate a local oscillation signal having a local oscillation frequency; and
   a switching circuit coupled to the local oscillator, the switching circuit configured to receive a channel selection signal and direct the local oscillation signal to only one of the first mixer or the second mixer based on the channel selection signal.

5. The integrated circuit of claim 1, wherein the first mixer includes a first mixer pass gate having:
   a first input node coupled with the first input port to receive the first RF signal;
   a first control gate configured to receive a local oscillation signal only when the first mixer is selected; and
   a first output node coupled with the first output lead, the first output node configured to output the first down-converted signal based on the first RF signal and the received local oscillation signal.

6. The integrated circuit of claim 5, wherein the second mixer includes a second mixer pass gate having:
   a second input node coupled with the second input port to receive the second RF signal;
   a second control gate configured to receive the local oscillation signal only when the second mixer is selected;
   a second output node coupled with the second output lead, the second output node configured to output the second down-converted signal based on the second RF signal and the received local oscillation signal.

7. The integrated circuit of claim 1, wherein:
   the first RF signal includes a first differential signal and a second differential signal representing an opposite polarity of the first differential signal; and
   the first mixer includes:
     a first pass gate configured to generate a first in-phase signal by passing the first differential signal at a local oscillation frequency based on a first local oscillation signal;
     a second pass gate configured to generate a first quadrature signal by passing the first differential signal at the local oscillation frequency based on a second local oscillation signal having a 90-degree phase delay from the first local oscillation signal;
     a third pass gate configured to generate a second in-phase signal by passing the second differential signal at the local oscillation frequency based on a third local oscillation signal having a 180-degree phase delay from the first local oscillation signal; and
     a fourth pass gate configured to generate a second quadrature signal by passing the second differential signal at the local oscillation frequency based on a fourth local oscillation signal having a 270-degree phase delay from the first local oscillation signal; and
   the first down-converted signal includes the first in-phase signal, the second in-phase signal, the first quadrature signal, and the second quadrature signal.

8. The integrated circuit of claim 1, wherein:
   the first down-converted signal includes a first down-converted frequency by subtracting a local oscillation frequency from the first carrier frequency; and
   the second down-converted signal includes a second down-converted frequency by subtracting the local oscillation frequency from the second carrier frequency.

9. An integrated circuit comprising:
a first input port configured to receive a first radio frequency (RF) signal having a first carrier frequency;
a second input port configured to receive a second RF signal having a second carrier frequency;
a first mixer coupled with the first input port, the first mixer having a first output lead configured to deliver a first down-converted signal down-converting the first RF signal to a baseband frequency only when the first mixer is enabled;
a second mixer coupled with the second input port, the second mixer having a second output lead configured to deliver a second down-converted signal down-converting the second RF signal to the baseband frequency only when the second mixer is enabled; and
a switching circuit coupled with the first mixer and the second mixer, the switching circuit configured to receive a channel selection signal, and the switching circuit configured to selectively enable one of the first mixer or the second mixer based on the channel selection signal.

10. The integrated circuit of claim 9, further comprising:
a convergent node joining the first output lead and the second output lead; and
a baseband circuit coupled with the convergent node to receive the first down-converted signal when the first mixer is selected or the second down-converted signal when the second mixer is selected.

11. The integrated circuit of claim 9, wherein the switching circuit is configured to:
generate a first enable signal when the first mixer is selected by the channel selection signal, the first enable signal enabling the first mixer; and
generate a second enable signal when the second mixer is selected by the channel selection signal, the second enable signal enabling the second mixer.

12. The integrated circuit of claim 9, wherein:
the switching circuit is configured to receive a local oscillation signal, the switching circuit is configured to relay the local oscillation signal to one of the first mixer or the second mixer based on the channel selection signal;
upon receiving the local oscillation signal, the first mixer is enabled to generate the first down-converted signal by mixing the first RF signal with the received local oscillation signal; and
upon receiving the local oscillation signal, the second mixer is enabled to generate the second down-converted signal by mixing the second RF signal with the received local oscillation signal.

13. The integrated circuit of claim 9, wherein:
the first mixer includes:
an in-phase pass gate configured to generate an in-phase signal by passing the first RF signal at a local oscillation frequency based on a first local oscillation signal; and
a quadrature pass gate configured to generate a quadrature signal by passing the first RF signal at the local oscillation frequency based on a second local oscillation signal having a 90-degree phase delay from the first local oscillation signal; and
the switching circuit is configured to deliver the first and second local oscillation signals to the first mixer when the first mixer is selected, and the switching circuit is configured to block the first and second local oscillation signals from reaching the first mixer when the first mixer is not selected.

14. The integrated circuit of claim 9, wherein:
the second mixer includes:
an in-phase pass gate configured to generate an in-phase signal by passing the second RF signal at a local oscillation frequency based on a first local oscillation signal; and
a quadrature pass gate configured to generate a quadrature signal by passing the second RF signal at the local oscillation frequency based on a second local oscillation signal having a 90-degree phase delay from the first local oscillation signal; and
the switching circuit is configured to deliver the first and second local oscillation signals to the second mixer when the second mixer is selected, and the switching circuit is configured to block the first and second local oscillation signals from reaching the second mixer when the second mixer is not selected.

15. The integrated circuit of claim 9, wherein:
the first down-converted signal includes a first down-converted frequency by subtracting a local oscillation frequency from the first carrier frequency; and
the second down-converted signal includes a second down-converted frequency by subtracting the local oscillation frequency from the second carrier frequency.

16. A front-end (FE) receiver comprising:
an antenna configured to receive a first radio frequency (RF) signal during a first time period and a second RF signal during a second time period outside of the first time period, the first RF signal having a first carrier frequency, and the second RF signal having a second carrier frequency;
a first mixer coupled with the antenna, the first mixer having a first output lead configured to deliver a first down-converted signal down-converting the first RF signal to a baseband frequency only when the first mixer is enabled;
a second mixer coupled with the antenna, the second mixer having a second output lead configured to deliver a second down-converted signal down-converting the second RF signal to the baseband frequency only when the second mixer is enabled; and
a switching circuit coupled with the first mixer and the second mixer, the switching circuit configured to receive a channel selection signal, and the switching circuit configured to selectively enable one of the first mixer or the second mixer based on the channel selection signal.

17. The FE receiver of claim 16, further comprising:
a convergent node joining the first output lead and the second output lead; and
a baseband circuit coupled with the convergent node to receive the first down-converted signal when the first mixer is selected or the second down-converted signal when the second mixer is selected.

18. The FE receiver of claim 16, wherein:
the switching circuit is configured to receive a local oscillation signal, the switching circuit is configured to relay the local oscillation signal to one of the first mixer or the second mixer based on the channel selection signal;
upon receiving the local oscillation signal, the first mixer is enabled to generate the first down-converted signal by mixing the first RF signal with the received local oscillation signal; and
upon receiving the local oscillation signal, the second mixer is enabled to generate the second down-converted signal by mixing the second RF signal with the received local oscillation signal.

19. The FE receiver of claim 16, wherein:

the first mixer includes:
- a first in-phase pass gate configured to generate a first in-phase signal by passing the first RF signal at a local oscillation frequency based on a first local oscillation signal; and
- a first quadrature pass gate configured to generate a first quadrature signal by passing the first RF signal at the local oscillation frequency based on a second local oscillation signal having a 90-degree phase delay from the first local oscillation signal;

the second mixer includes:
- a second in-phase pass gate configured to generate a second in-phase signal by passing the second RF signal at a local oscillation frequency based on the first local oscillation signal; and
- a second quadrature pass gate configured to generate a second quadrature signal by passing the second RF signal at the local oscillation frequency based on the second local oscillation signal; and the switching circuit is configured to:
- deliver the first and second local oscillation signals to the first mixer only when the first mixer is selected; and
- deliver the first and second local oscillation signals to the second mixer only when the second mixer is selected.

20. The FE receiver of claim 16, wherein:

the first down-converted signal includes a first down-converted frequency by subtracting a local oscillation frequency from the first carrier frequency; and the second down-converted signal includes a second down-converted frequency by subtracting the local oscillation frequency from the second carrier frequency.

* * * * *